United States Patent
Hayata (10) Patent No.: US 7,079,569 B1
(45) Date of Patent: Jul. 18, 2006

(54) SEARCH METHOD IN CDMA MOBILE COMMUNICATION RECEIVING SYSTEM AND RECEIVING DEVICE

(75) Inventor: Toshihiro Hayata, Tokyo (JP)

(73) Assignee: NEC Corporation, Tokyo (JP)

( * ) Notice: Subject to any disclaimer, the term of this patent is extended or adjusted under 35 U.S.C. 154(b) by 844 days.

(21) Appl. No.: 10/088,694

(22) PCT Filed: Sep. 18, 2000

(86) PCT No.: PCT/JP00/06352

§ 371 (c)(1),
(2), (4) Date: Jun. 28, 2002

(87) PCT Pub. No.: WO01/22638

PCT Pub. Date: Mar. 29, 2001

(30) Foreign Application Priority Data

Sep. 24, 1999 (JP) ................................. 11/270612

(51) Int. Cl.
*H04B 1/69* (2006.01)
(52) U.S. Cl. ...................................... 375/147; 375/349
(58) Field of Classification Search ................ 375/251, 375/143, 150, 152, 349, 142, 354, 1; 370/342, 370/350, 310, 331, 491, 332; 455/501, 63.1, 455/65, 67.13, 561, 500, 13.4, 38.3, 67.3, 455/226.3
See application file for complete search history.

(56) References Cited

U.S. PATENT DOCUMENTS

| | | | |
|---|---|---|---|
| 5,644,591 A * | 7/1997 | Sutton | 375/142 |
| 5,648,983 A * | 7/1997 | Kostic et al. | 375/150 |
| 5,781,543 A | 7/1998 | Ault et al. | |
| 5,812,593 A * | 9/1998 | Kaku | 375/150 |
| 5,910,948 A * | 6/1999 | Shou et al. | 370/335 |
| 6,044,104 A | 3/2000 | Watanabe | |
| 6,188,682 B1 * | 2/2001 | Takagi et al. | 370/342 |
| 6,370,397 B1 * | 4/2002 | Popovic et al. | 455/561 |
| 6,693,953 B1 * | 2/2004 | Cox et al. | 375/141 |
| 6,731,622 B1 * | 5/2004 | Frank et al. | 370/342 |

FOREIGN PATENT DOCUMENTS

| | | |
|---|---|---|
| EP | 0 661 831 A2 | 7/1995 |
| EP | 0 924 868 A1 | 6/1999 |
| EP | 1 052 783 A2 | 11/2000 |
| JP | 09-181704 | 7/1997 |
| JP | 09-232995 | 9/1997 |
| JP | 10-062515 | 3/1998 |
| JP | 10-294717 | 11/1998 |
| JP | 11-187450 | 7/1999 |
| JP | 2000-252867 | 9/2000 |
| JP | 2000-324016 | 11/2000 |
| WO | WO 96/04716 A1 | 2/1996 |
| WO | WO 9604716 A1 * | 2/1996 |
| WO | WO 99/46875 A1 | 9/1999 |

OTHER PUBLICATIONS

Diversity receiver of a CDMA system in mobile multipath fading environments□□Yang, J.; Sood, P.; Vehicular Technology Conference, 1995 IEEE 45th□□vol. 2, Jul. 25-28, 1995 pp. 684-688 vol. 2.*

* cited by examiner

*Primary Examiner*—Jay K. Patel
*Assistant Examiner*—Jacob Meek
(74) *Attorney, Agent, or Firm*—Foley & Lardner LLP (57) ABSTRACT

Two kinds of user-tailored searchers, narrow-search-range searchers (3, 4) and a wide-search-range searcher (5), are set out of a plurality of groups of searchers in compliance with the features of two kinds of multi-paths in mobile communication, and are used, thereby making it possible to search efficiently with high accuracy and on reduced hardware and software scales.

8 Claims, 9 Drawing Sheets

SEARCH METHOD IN CDMA MOBILE COMMUNICATION RECEIVING SYSTEM AND RECEIVING DEVICE

1. TECHNICAL FIELD

The present invention relates to a synchronous acquisition search method and receiving apparatus in a reception scheme of a CDMA (Code Division Multiple Access) mobile communication system and, more particularly, to a synchronous acquisition search method and receiving apparatus which use a plurality of searchers whose search ranges are arbitrarily set in accordance with the states of reception paths.

2. BACKGROUND ART

Recently, a great deal of attention has been paid to a cellular telephone system of the CDMA scheme in which spread spectrum processing of a carrier wave is performed by using a pseudo random code as a spreading code, and the pattern or phase of the code sequence of the spread signal is changed to allow multiple access.

In a cellular telephone system of this CDMA scheme, the correlation start position of a received spread signal must be determined at high speed. Once this initial synchronization is acquired, control needs to be performed to always maintain synchronization for correlation computation by performing tracing to match a chip timing with path jitter variations caused on a radio channel.

In a general mobile communication system, the influence of multi-path fading poses a serious problem. The CDMA scheme uses a RAKE reception scheme to positively and effectively use such multi-paths. This RAKE reception scheme uses a plurality of fingers for performing reception processing in correspondence with a plurality of multi-paths and searchers for generating reception timings. After reception processing, the resultant signals are combined.

As described above, searchers are used to perform synchronization acquisition of a reception signal and obtain a reception timing from the delay profile of a multi-path.

Figure 7:
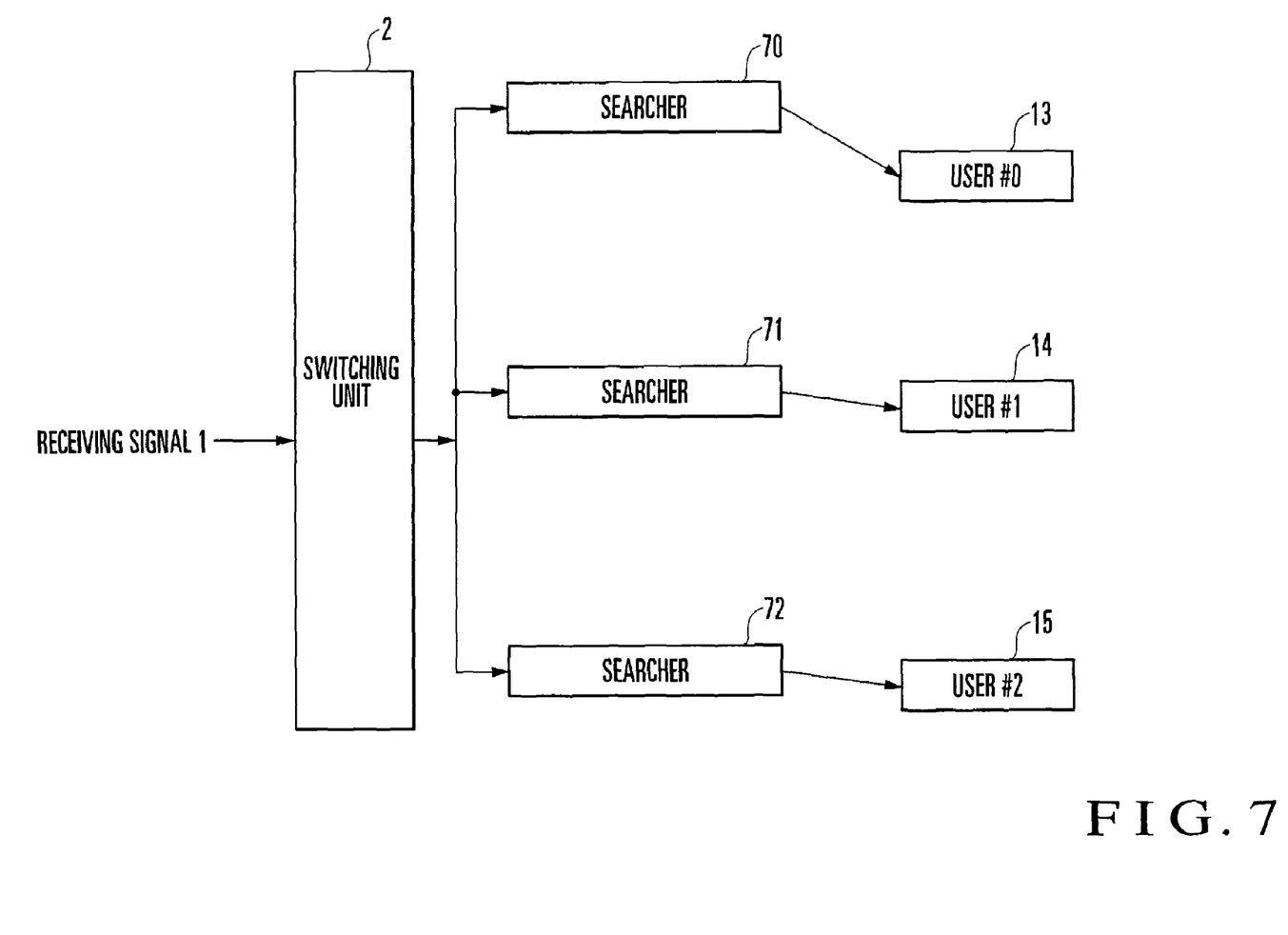
FIG. 7 is a view showing the concept of a conventional searcher.

FIG. 7 shows the concept of general-purpose searchers to explain a conventional search method. Referring to FIG. 7, a reception signal 1 is sent to a plurality of searchers 70 to 72 through a switching unit 2, and one searcher is assigned to each of users 13 to 15. For example, the searcher 70 is assigned to the user #0 (13), the searcher 71 is assigned to the user #1 (14), and the searcher 72 is assigned to the user #2 (15).

Figure 8:
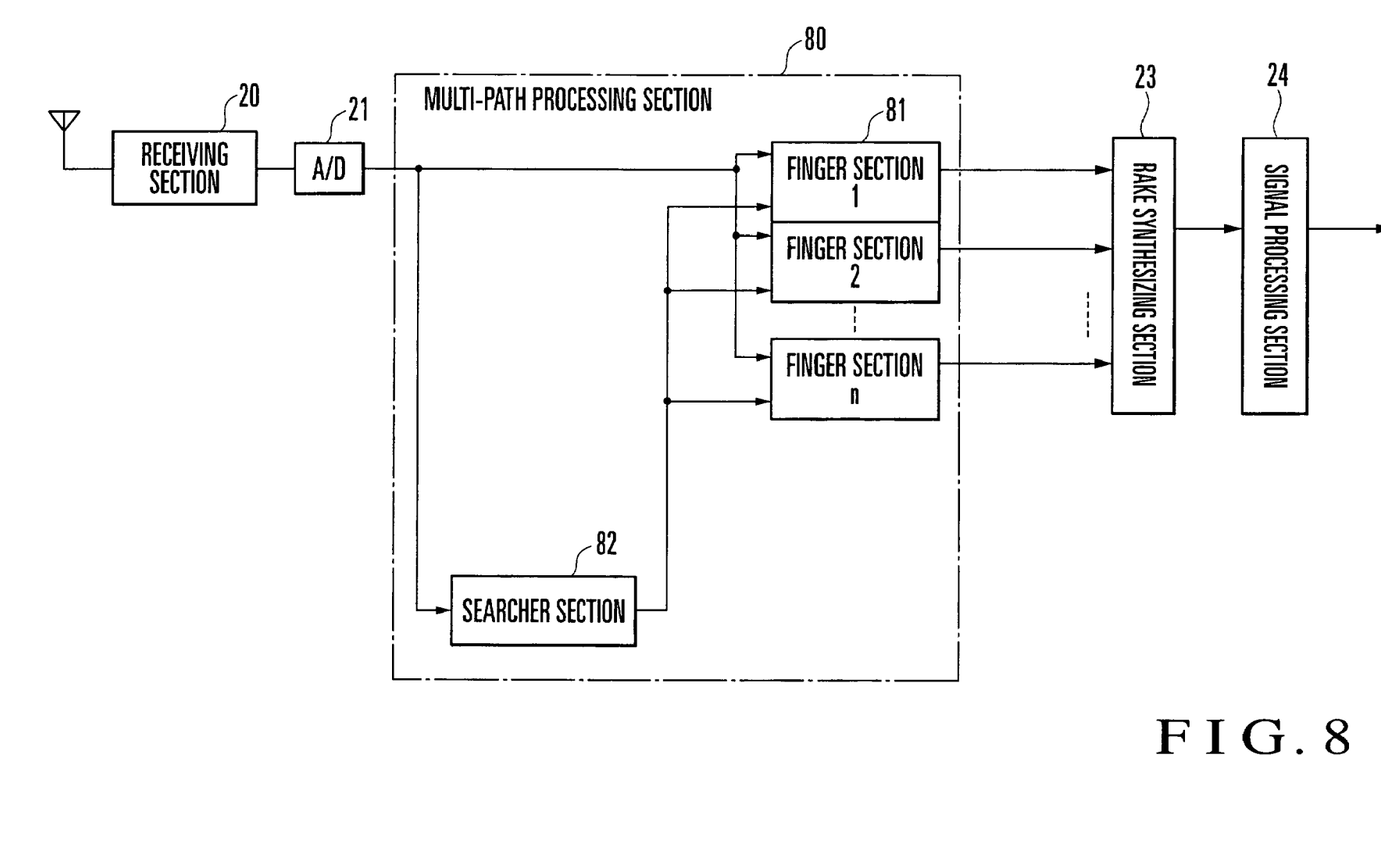
FIG. 8 is a block diagram showing the overall arrangement of a receiving apparatus using a conventional search method.

FIG. 8 shows the overall arrangement of a receiving apparatus using the conventional search method. FIG. 8 shows only a portion corresponding to one user. Referring to FIG. 8, a radio signal propagating through a radio channel is received by a receiving section 20 through an antenna. This reception signal is converted into a digital signal by an analog/digital conversion section 21 connected to the output stage of the receiving section 20, and becomes a baseband signal. This signal is sent to a multi-path processing section 80. In the multi-path processing section 80, the input digital signal (baseband signal) is sent to a plurality of finger sections 81 which perform processing for each of a plurality of reception paths and a searcher section 82 which generates a reception timing. The finger sections 81 then perform reception processing in accordance with a reception path timing as an output from the searcher section 82.

The reception signal outputs processed by the finger sections 81 are sent to a RAKE combining section 23 to be combined. The resultant signal is sent to a signal processing section 24 to be decoded.

Figure 9:
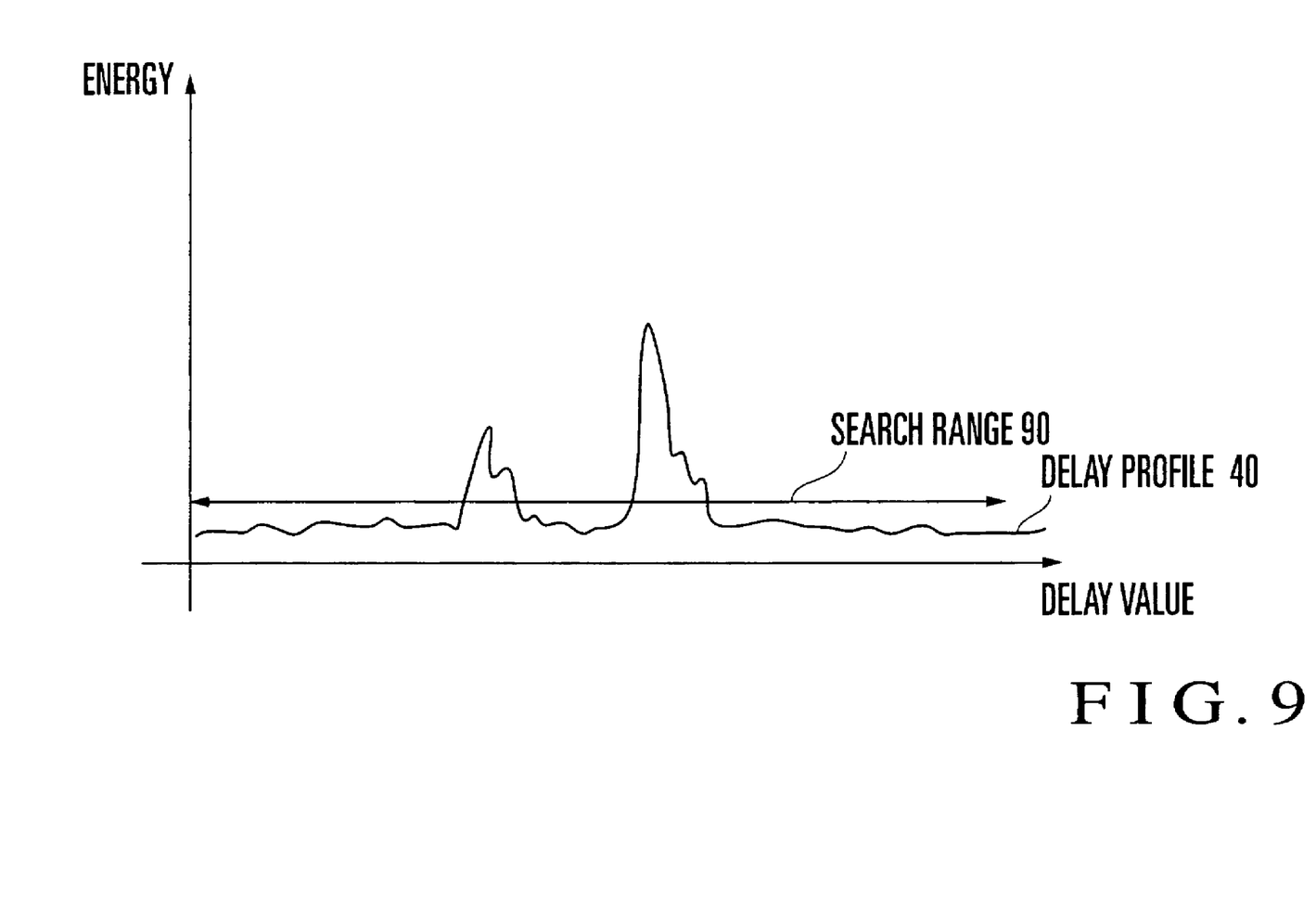
FIG. 9 is a view for explaining the operation of a conventional searcher section in FIG. 8.

The operation of the conventional searcher section 82 shown in FIG. 8 will be described below with reference to FIG. 9. In the conventional searcher section 82, the entire cell radius is set as a search range 90. An entire delay profile 40 is searched by using the single searcher section 82.

Multi-path in mobile communication has the following two features:

① Multi-path occurs in a relatively narrow range at considerably frequent intervals. This range does not quickly changes. A search must therefore be made in a narrow range.

② In mobile communication, an abrupt change in reception state inevitably occurs when, for example, a mobile station moves into the shadow of a building or the like. This phenomenon is called shadowing, which does not occur very often. However, in this phenomenon, it suddenly happens that a signal cannot be received at the preceding reception timing, and the position where a new path will appear cannot be known. For this reason, the entire cell radius must always be searched. That is, the behavior of multi-path in mobile communication includes the above two contradictory features.

3. DISCLOSURE OF INVENTION (Problem to be Solved by the Invention)

In the conventional method in which processing is performed by using one type of searcher, a deterioration in accuracy occurs as the hardware or software scale of the searcher increases or the processing delay increases.

It is, therefore, an object of the present invention to provide a search method and receiving apparatus in a CDMA mobile communication reception scheme which exhibit higher accuracy than the prior art.

(Means of Solution to the Problem)

In order to achieve the above object, according to the present invention, two types of searchers, i.e., narrow-search-range searchers and wide-search-range searchers, are set out of a plurality of groups of searchers in accordance with the features of the two types of multi-paths described above.

In other words, a search method and receiving apparatus in the CDMA mobile communication reception scheme according to the present invention are characterized in that one wide-search-range cell searcher which searches the entire cell radius and one or more narrow-search-range delay spread searchers which respectively search a plurality of multi-paths are assigned, out of a plurality of groups of searchers, in correspondence with the respective users in accordance with the multi-path condition.

More specifically, in a reception scheme of the CDMA mobile communication system which is constituted by a receiving section, an analog/digital conversion section, a control section, a plurality of searcher sections, a plurality of finger sections, a RAKE combining section, and a signal processing section, the control section sets the search width offset value to 0 to assign one cell searcher, and sets the entire cell radius as a search range.

In addition, in order to assign delay spread searchers, the control section calculates the number of peak levels equal to or higher than a threshold from effective path timing information on the delay profile of the reception signal output from each of the searcher sections so as to determine the number of necessary delay spread searchers. The control section also calculates the width of peak levels equal to or higher than the threshold from the effective path timing information so as to determine the search range of each delay search searcher. In addition, the control section calculates the position of the start timing of the peak levels equal to or higher than the threshold from the effective path timing information so as to determine the start point of the search operation of each delay spread searcher. This makes it possible to prevent an increase in processing delay and search efficiently with high accuracy and on reduced hardware and software scales.

If a new cell searcher or delay spread searcher must be assigned as the number of users or multi-paths increases while all the searchers are used, the control section releases the delay spread searcher, of the searchers that have already been assigned, which exhibits the lowest degree of influence on each user. This makes it possible to realize more effective use of searchers.

In addition, the control section calculates a barycentric position corresponding to the sum of the products of pieces of energy information and pieces of position information about a plurality of paths which are equal to or higher than a predetermined level on the delay profiles of delay spread searchers, and performs control to prevent the calculated position from falling out of the threshold of a search range. This makes it possible to suppress a search error accompanying changes in the position of a mobile station, resulting in an increase in search accuracy.

5. BEST MODE OF CARRYING OUT THE INVENTION

An embodiment of the present invention will be described below with reference to the accompanying drawings.

In the present invention, the following two types of searchers are defined, and the following operation conditions are set for the respective searchers to implement the following functions:

① cell searcher: The search range is set to the entire radius of a target cell; the search resolution is low, and the time required for a search is long.

② delay spread searcher: The search range is a narrow range in which one effective multi-path can be received; the search resolution is high, and the time required for a search is short.

Figure 1:
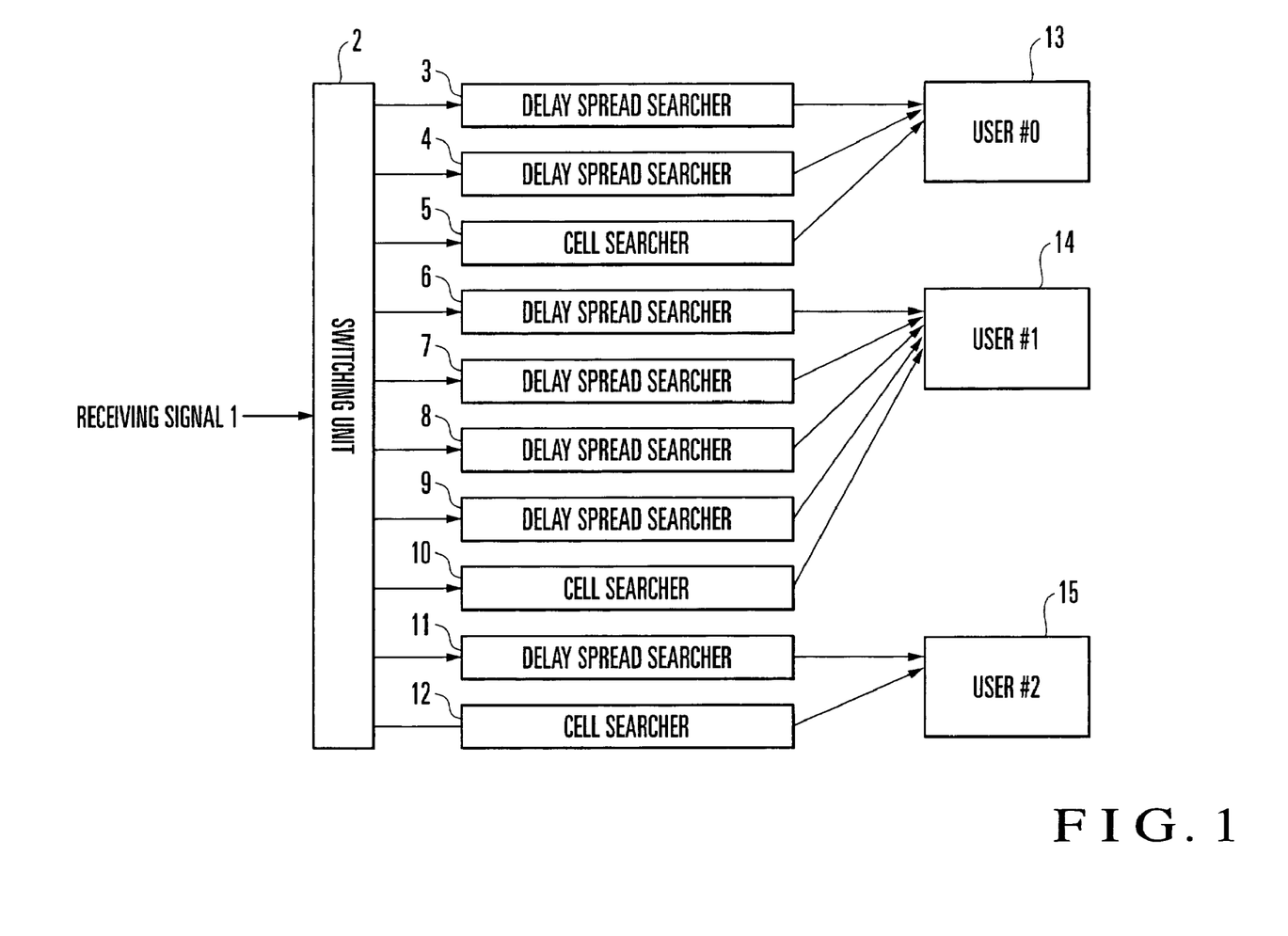
FIG. 1 is a view showing the concept of a receiving apparatus to explain a search method according to the present invention.

FIG. 1 shows the concept of a receiving apparatus which is used to explain a search method according to the present invention. Referring to FIG. 1, a reception signal 1 is sent to a plurality of searchers 3 to 12 through a switching unit 2. One of the cell searchers 5, 10, and 12 and at least one of the delay searchers 3, 4, 6, 7, 8, 9, and 11 are assigned to each user.

For example, for a user #0 (13) shown in FIG. 1, since a reception signal contains two signals that are sent through different reception paths and have different phases, i.e., two multi-paths have occurred, the delay spread searchers 3 and 4 are assigned to the respective multi-paths. In addition to the two delay spread searchers described above, one cell searcher 5 that searches the entire radius of a cell regardless of the multi-path condition is assigned to the user.

For a user #1 (14), since four multi-paths have occurred in the reception signal, the delay spread searchers 6, 7, 8, and 9 are assigned to the respective multi-paths. In addition to the four delay spread searchers described above, the cell searcher 10 that searches the entire radius of a cell is assigned to the user.

For a user #2 (15), since one multi-path has occurred in the reception signal, the delay spread searcher 11 is assigned to the single multi-path. In addition, the cell searcher 12 that searches the entire radius of a cell is assigned to the user.

As described above, the number of multi-paths varies depending on the reception signal for each user. For this reason, for a user subjected to many multi-paths, many delay spread searchers equal in number to the multi-paths are assigned. For a user subjected to a small number of multi-paths, a small number of delay spread searchers are assigned.

Figure 2:
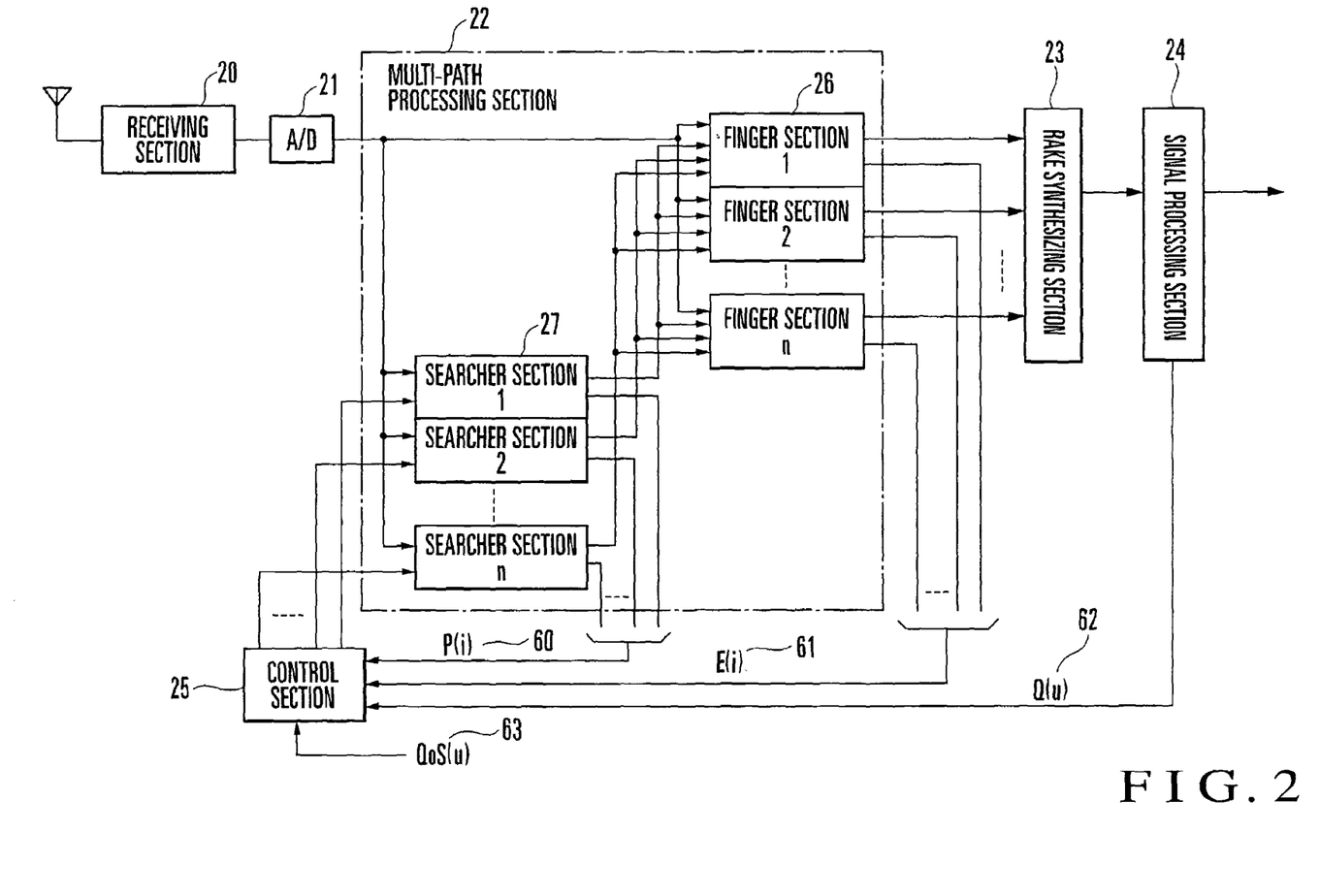
FIG. 2 is a block diagram showing the overall arrangement of the receiving apparatus using the search method according to the present invention.

FIG. 2 shows the overall arrangement of a receiving apparatus using the search method according to the present invention. FIG. 2 shows only a portion corresponding to one user. Referring to FIG. 2, a radio signal propagating through a radio channel is received by a receiving section 20 through an antenna. This reception signal is converted into a digital signal by an analog/digital conversion section (A/D) 21 connected to the output stage of the receiving section 20, and becomes a baseband signal. This signal is sent to a multi-path processing section 22.

In the multi-path processing section 22, the input baseband signal is sent to a plurality of finger sections 26 and a plurality of searcher sections 27 for generating a reception timing. For each of a plurality of reception paths, the corresponding searcher section 27 obtains a correlation value level while shifting the dispreading timing of the baseband signal little by little, and designates an optimal reception timing to the corresponding finger section 26. For each of a plurality of reception paths, the corresponding finger section 26 despreads the baseband signal at the reception timing designated by the searcher section 27, thereby performing detection processing.

Outputs from the finger sections 26 are sent to a RAKE combining section 23 to be added together. The resultant signal is sent to a signal processing section 24 to be decoded.

The operation of the searcher sections 27 is controlled by a control section 25. This control operation is performed on the basis of the following four input signals:

① P(i) input signal 60: the ith effective path timing information on the delay profile of the reception signal output from each searcher section 27;

② E(i) input signal 61: the ith effective path energy information of the reception signal processed by each finger section 26 (electric field strength in the ith effective path=Eb/Io);

③ Q(U) input signal 62: the current reception quality (current frame error rate) of a signal that is output from the signal processing section 24 and associated with a user U; and ④ QoS(U) input signal 63: the service quality (predetermined frame error rate) required for the user U and registered in a system data.

More specifically, the control section 25 generates control signals for classifying searchers into two types of function-specific searchers (cell searcher and delay searcher) from these input signals, and changes control signals to optimally maintain the set states of the searchers.

Figure 3:
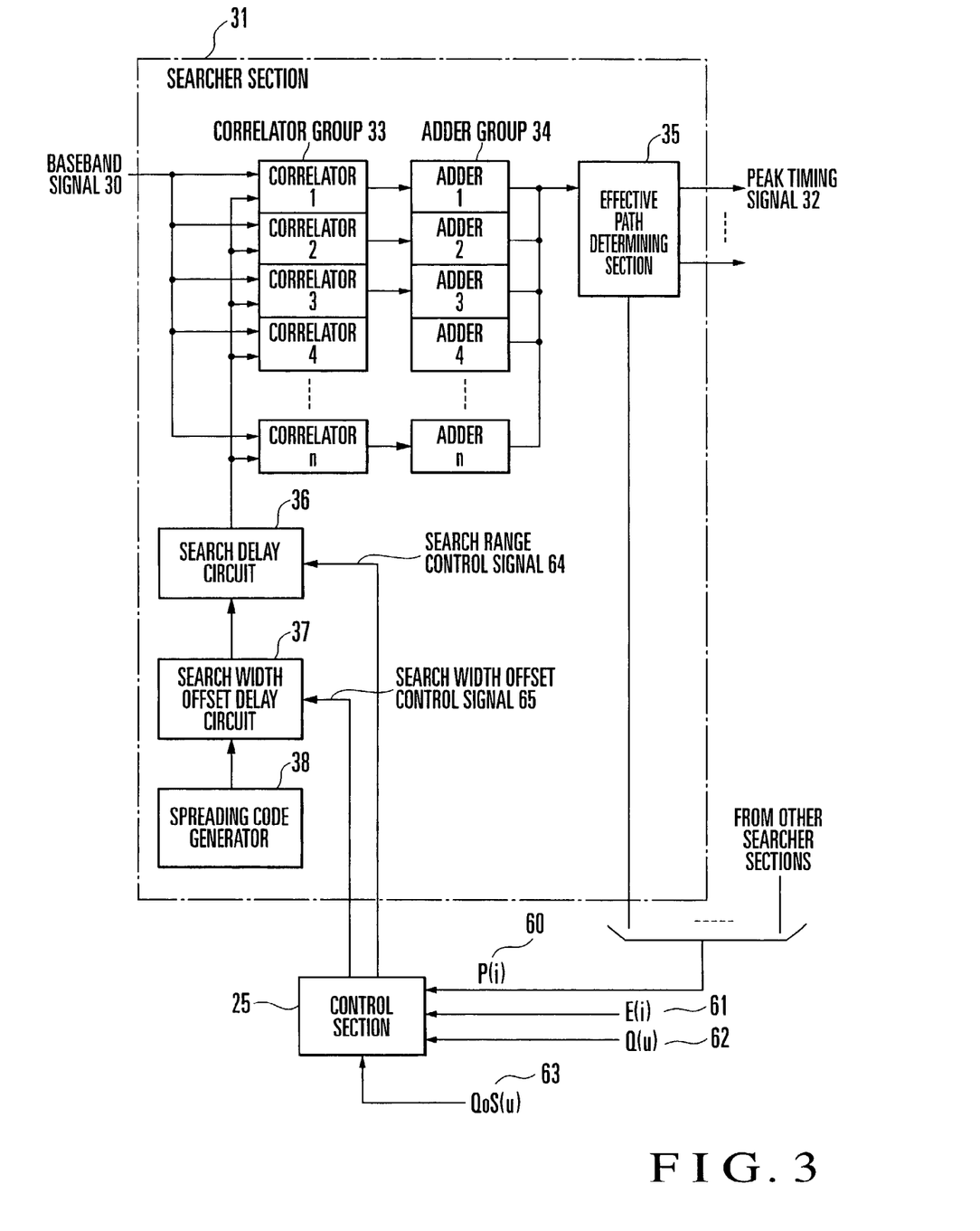
FIG. 3 is a block diagram showing the detailed arrangement of one searcher section using the search method according to the present invention.

FIG. 3 shows the detailed arrangement of one of the searcher sections 27 shown in FIG. 2. In this case, this searcher section will be described as a searcher section 31.

Referring to FIG. 3, a baseband signal 30 sent from the A/D section 21 is input to each of correlators 1 to n of a plurality of groups of correlators 33, together with the spreading code controlled by a search width offset delay circuit 37 and search delay circuit 36, which are two types of delay circuits of the searcher section 31. The respective correlators 1 to n perform dispreading at reception timings that are different from each other little by little. Outputs from the respective correlators of the plurality of groups of correlators 33 are respectively input to adders 1 to n of a plurality of groups of adders 34. Each adder adds (integrates) a correlation value by a designated number of times. Outputs from the respective adders of the plurality of groups of adders 34 are input to an effective path determining section 35. The effective path determining section 35 searches the sum correlation values for a reception timing with a high level (searches for a peak) and determines whether to set the corresponding path as an effective path.

The effective path determining section 35 performs protection processing to prevent frequent changes in the assignment of effective paths even with variations in level due to fading and slight changes in reception timing, thereby allowing stable reception of signals. The information of a determined effective path is output as a peak timing signal 32 to be supplied to a corresponding one of the finger sections 26, and is also output as the P(i) signal 60 to the control section 25.

The control section 25 performs first searcher assigning operation on the basis of the P(i) signal 60 which is the ith effective path timing information on the delay profile of the reception signal output from each searcher section. On the basis of this effective path timing information P(i) signal 60, the control section 25 calculates the specific number of peak levels equal to or higher than a threshold, the specific width of the peak levels, the specific location of the start timing of each peak level, and the like.

The control section 25 determines the number of necessary delay spread searchers from the number of peak levels equal to or higher than this threshold, calculates a search range control signal 64 from the width of the peak levels, and calculates a search width offset control signal 65 from the start timing of each peak level.

A spreading code generator 38 generates a spreading code for dispreading a baseband signal. This spreading code is supplied to each correlator of the plurality of groups of correlators 33 through the search width offset delay circuit 37 and search delay circuit 36 which are two types of delay circuits.

The search width offset delay circuit 37 determines the start point of searching operation by delaying a spreading code by a search width offset amount on the basis of the search width offset control signal 65. The search delay circuit 36 delays the spreading code input from the search width offset delay circuit 37 little by little such that the dispreading timings of the respective correlators of the plurality of groups of correlators 33 differ from each other by a predetermined time interval. The search delay circuit 36 also determines the search range of each searcher section on the basis of the search range control signal 64.

Figure 4:
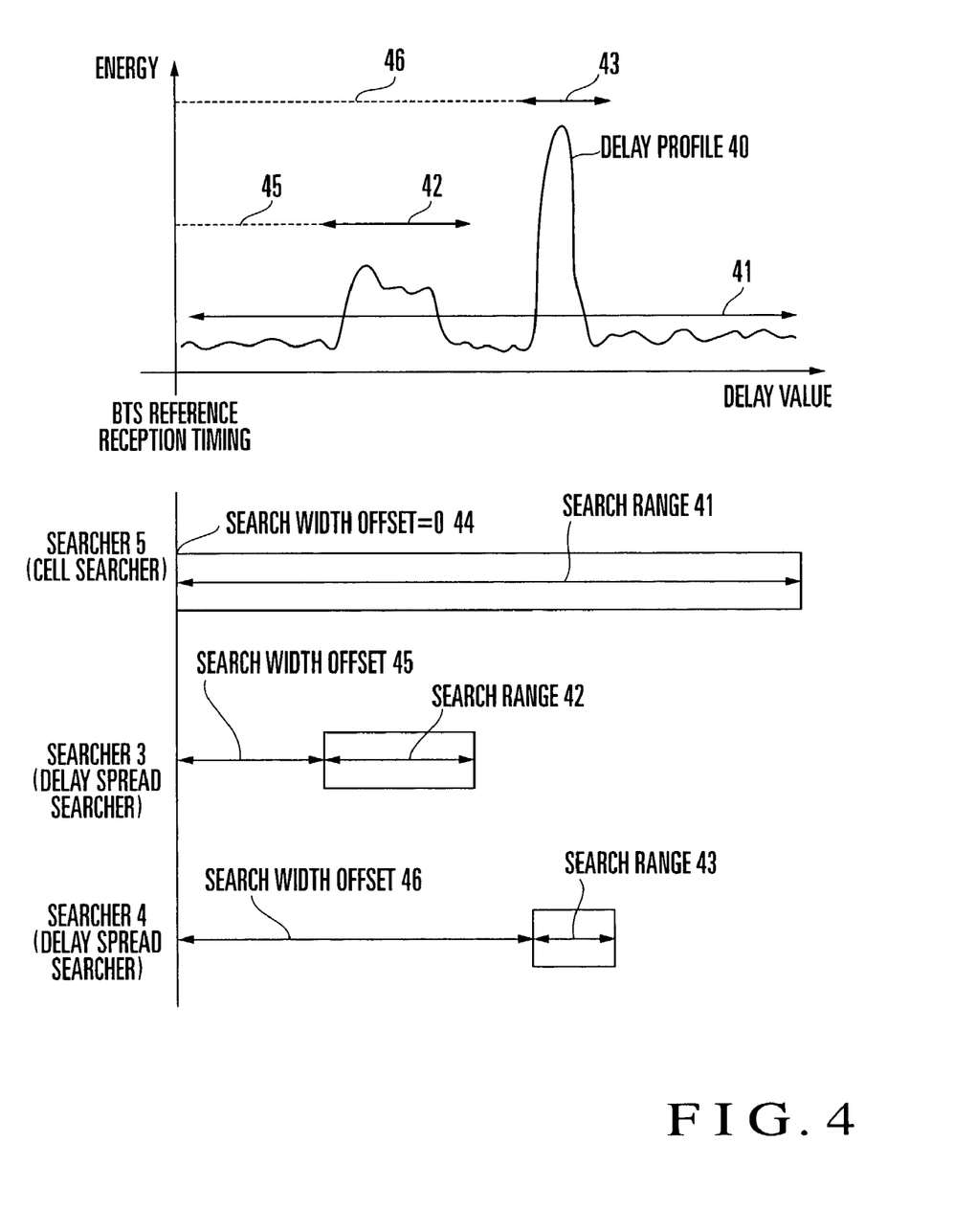
FIG. 4 is a view for explaining searcher assigning operation using the search method according to the present invention.

Searcher assigning operation using the search method of the present invention will be described next with reference to FIG. 4. FIG. 4 shows a case for the user #0 (13) in FIG. 1. The reference reception timing of a radio transceiver station (BTS) indicates propagation delay=0 with reference to the reception timing of the BTS. With respect to a reception signal with a delay profile 40, the number of paths (the number of effective paths) equal to or higher than the peak level threshold is two. In this case, the control section 25 assigns the searcher 5 set as a cell searcher, and the searchers 3 and 4 set as delay spread searchers 3 and 4 to the respective effective paths.

The searcher 5 set as a cell searcher sets a search width offset 44 to 0 so as to set a search range 41 to the entire radius of a cell. The searcher 3 set as a delay spread searcher operates with a search width offset 45 and search range 42 as shown in FIG. 4 to search for the first path. Likewise, the searcher 4 set as a delay spread searcher operates with a search width offset 46 and search range 43 as shown in FIG. 4 so as to search for the second path.

The control section 25 controls each searcher in this manner. Since the number of searchers is limited in the hardware resource, if a new cell searcher or delay spread searcher must be assigned as the number of users or multi-paths increases while all the searchers are used, the delay spread searcher, of the searchers that have already been assigned, which exhibits the lowest degree of influence on each user is released.

In this case, the control section 25 calculates the degrees of influences of assigned searchers on each user on the basis of the following three factors:

① QoS(U): the service quality (predetermined frame error rate) registered in system data and required for the user U;

② Q(U): the current reception quality (current frame error rate) of a signal output from the signal processing section 24 and associated with the user U; and ③ E(ds): the energy information in the effective path of a target delay spread searcher (electric field strength in the effective path=Eb/Io).

Letting DS be the degree of influence on a searcher that has already been assigned to a user, and DSmin be the minimum value of DS, the minimum value DSmin is obtained by calculating equation (1) given below with respect to all delay spread searchers in all users:

$$DSmin = MIN[(QoS(U) - Q(U)) \times E(ds)]$$

for all U for all ds  (1)

The control section 25 operates to release the delay spread searcher corresponding to DSmin and assign the released searcher to a new user or multi-path.

Figure 5A:
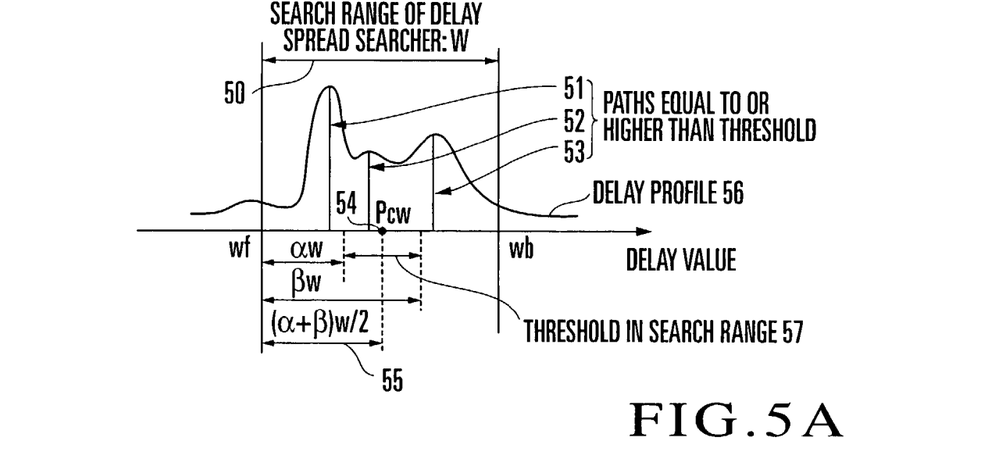
FIGS. 5(A), 5(B) and 5(C) are views for explaining search range moving operation using the search method according to the present invention.

Search range moving operation using the search method of the present invention will be described next with reference to FIGS. 5A, 5B, and 5C. Protection processing is performed for each searcher to prevent frequent changes in the assignment of effective paths even with variations in the level of a reception signal due to fading and slight changes in reception timing. If, however, a mobile station moves beyond this protection processing after a searcher is assigned, a delay profile greatly varies and falls out of the search range of the searcher, resulting in a decrease in search accuracy.

The control section 25 therefore obtains a barycenter Pc of the delay profile, and controls the search range of the searcher in accordance with variations in the position of the barycenter Pc. First of all, the barycenter Pc of the delay profile is obtained on the basis of the following three factors by using equation (2):
① N: the number of paths equal to or higher than a predetermined level in the search range of a delay spread searcher (the number of effective paths);
② P(i): the ith effective path position information on the delay profile; and
③ E(i): the ith effective path energy information (electric field strength in the ith effective path=Eb/Io) on the delay profile.

$$Pc = \sum_{i=1}^{N} E(i) \times P(i) \quad (2)$$

The barycenter Pc of this delay profile is constituted by barycentric energy information PcE and barycentric position information PcW, and the barycentric position information PcW of the barycenter Pc is obtained by $$PcW = Pc \div PcE \quad (3)$$

The operation of changing the search range of the searcher is obtained on the basis of the following factors by using equation (4) so as to match variations in the position of the barycenter Pc:
① Wf_old: the search start position of the delay spread searcher before the change;
② Wf_new: the search start position of the delay spread searcher after the change;
③ W: the search range of the delay spread searcher; and
④ α, β: constants (α<β)

if($PcW<(Wf\_old+\alpha W)$) then $Wf\_new$ $=Wf\_old-[Wf\_old+(\alpha+\beta)W/2)-PcW]$ else if($PcW>(Wf\_old+\beta)$) then $Wf\_new$ $=Wf\_old+[PcW-(Wf\_old+(\alpha+\beta)W/2)]$ else then no change in search range (4)

The above operation will be described with reference to FIGS. 5A, 5B, and 5C. FIG. 5A shows the relationship between a delay profile 56 at the beginning of assignment of a delay spread searcher and a search range 50 of the delay spread searcher. Referring to FIG. 5A, a calculated barycentric position PcW 54 is specified from the overall calculated value obtained by specified by multiplying the energy information and position information of each of paths 51, 52, and 53 equal to or higher than a predetermined level and adding the respective products together. Obviously, at the beginning of assignment of the delay spread searcher, the barycentric position PcW 54 coincides with a median 55 of thresholds 57 in the search range of the delay spread searcher, and the delay profile 56 falls within the search range of the delay spread searcher. Note that the control section 25 does not activate the operation of changing the search range of the delay spread searcher while the barycentric position PcW 54 falls within the position range of the thresholds 57.

Figure 5B:
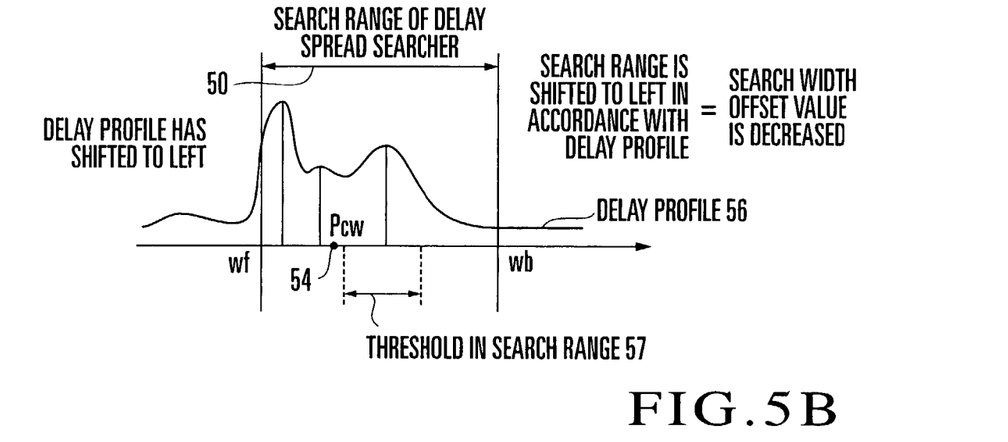

FIG. 5B shows a case where the delay profile 56 shifts to the left after assignment of the description because the mobile station has greatly approached the radio station. Referring to FIG. 5B, the barycentric position PcW 54 of the delay profile 56 shifts to the left beyond the position range of the thresholds 57 in the search range of the delay spread searcher. The control section 25 activates the operation of changing the search range of the delay spread searcher. The control section 25 shifts the search range 50 of the delay spread searcher to the left by the value obtained by subtracting the barycentric position PcW 54: the value of PcW of the delay profile 56 from the median 55: Wf_old+(α+β)W/2 of the thresholds 57 in the search range of the delay spread searcher as indicated by equation (4). That is, the control section 25 changes the search range of the delay spread searcher by subtracting the above value from the value of the search width offset control signal 65 that controls the search width offset delay circuit 37.

Figure 5C:
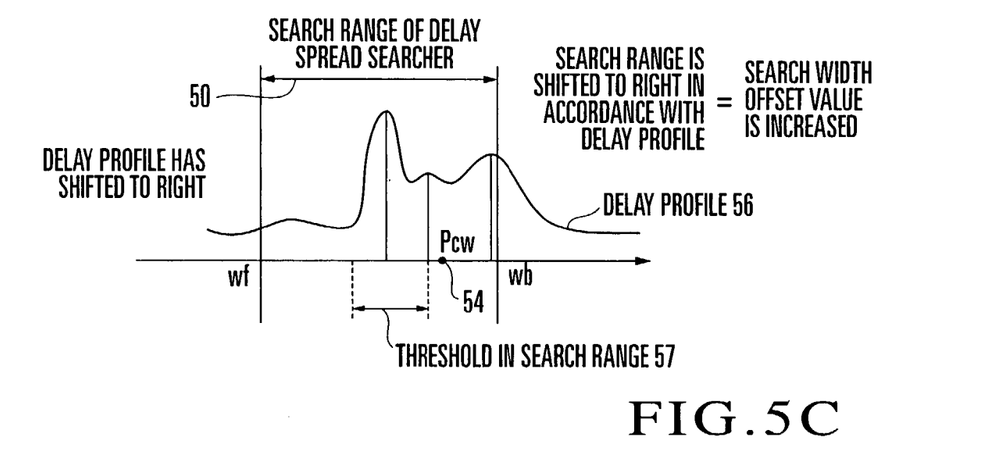

FIG. 5C shows a case where the delay profile 56 shifts to the right after assignment of the description because the mobile station has greatly moved away from the radio station. Referring to FIG. 5C, the barycentric position PcW 54 of the delay profile 56 shifts to the right beyond the position range of the thresholds 57 in the search range of the delay spread searcher. The control section 25 activates the operation of changing the search range of the delay spread searcher. The control section 25 shifts the search range 50 of the delay spread searcher to the right by the value obtained by subtracting the median 55: Wf_old+(α+β)W/2 of the thresholds 57 in the search range of the delay spread searcher from the barycentric position PcW 54: the value of PcW of the delay profile 56 from as indicated by equation (4). That is, the control section 25 changes the search range of the delay spread searcher by adding the above value to the value of the search width offset control signal 65 that controls the search width offset delay circuit 37.

The overall operation of a searcher using the search method of the present invention will be described next with reference to FIG. 6.

Figure 6:
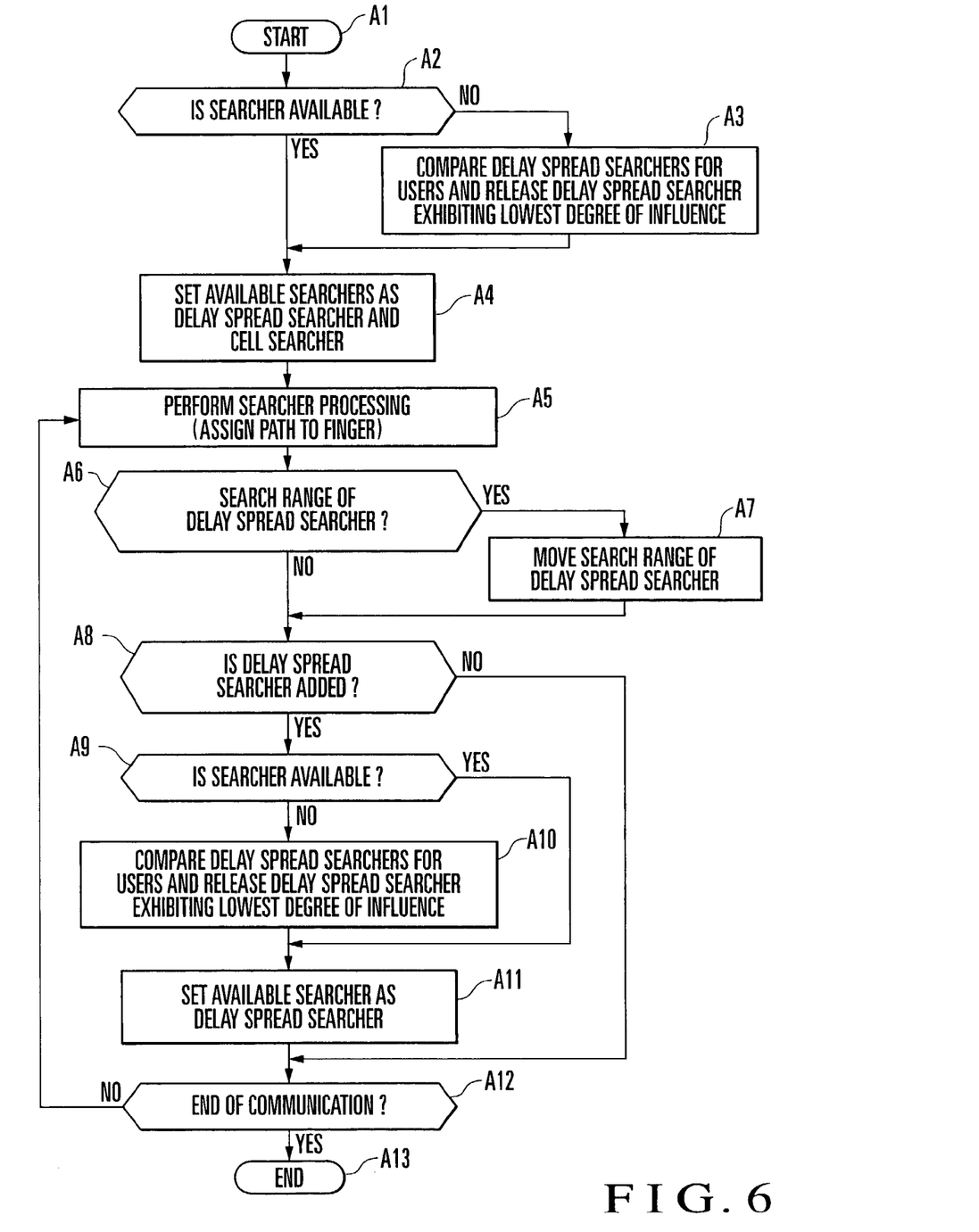
FIG. 6 is a flow chart showing the overall operation of a searcher using the search method according to the present invention.

Referring to FIG. 6, when a signal from a new user is received, the control section 25 for searchers is activated (step A1) to check whether there is any unused searcher that can be assigned to the user (step A2).

If there is no unused searcher, a delay spread searcher exhibiting the lowest degree of influence obtained from operation based on equation (1) is released (step A3). When an unused searcher is prepared, the control section 25 sets the available searcher as a delay spread searcher or cell searcher (step A4). Thereafter, search processing is performed by using this searcher, and a path is assigned to each finger (step A5).

The control section 25 checks the barycentric position of the delay spread searcher to monitor whether the barycentric position falls within the threshold of the search range (step A6). If the barycentric position falls within the threshold, the control section 25 keeps the search range unchanged. If the barycentric position exceeds the threshold, the control section 25 moves the search range of the delay spread searcher by the operation based on equation (4) given above and FIGS. 5A, 5B, and 5C (step A7).

The control section 25 monitors a multi-path condition through the delay spread searchers and cell searchers, and determines on the basis of the multi-path condition whether to add a delay spread searcher to be assigned to the user (step A8). In adding a delay spread searcher, as in the operation from steps A2 to A4, it is checked whether there is any unused searcher that can be assigned to the user (step A9), a delay spread searcher exhibiting the lowest degree of influence obtained from the operation based on equation (1) given above is released (step A10) if there is no unused searcher, and the available searcher is set as a necessary delay spread searcher (step A11), thereby adding the delay spread searcher.

Finally, the control section 25 monitors the end of communication (step A12). While the communication continues, the flow returns to step A5 to continue search processing, and the series of operations are repeated. After the communication is completed, this operation is terminated (step A13).

As described above, according to the present invention, an increase in processing delay can be prevented by using a combination of two types of searchers, i.e., narrow-search-range searchers and wide-search-range searchers, of a plurality of groups of searchers for each user in accordance with the features of a multi-path that has occurred. This makes it possible to provide an efficient search method that suppresses an increase in the size of hardware and software.

If all the searchers are used, the control section checks a delay spread searcher, of the assigned searchers, which exhibits the lowest degree of influence on each user, and releases it, thereby allowing effective use of searchers.

In addition, the control section obtains the barycenter of a delay profile, and controls the search range of the searcher in accordance with variations in this barycentric position. This makes it possible to suppress a search error accompanying changes in the position of a mobile station, resulting in an increase in search accuracy.

The invention claimed is:

1. A search method in a CDMA mobile communication scheme, characterized in that
a receiving section which receives a reception signal sent through a radio channel, an analog/digital conversion section which converts the reception signal into a digital baseband signal, a multi-path processing section which includes a plurality of searcher sections and a plurality of finger sections and outputs a plurality of detection signals by processing multi-paths contained in the baseband signal, a RAKE combining section which adds the detection signals to output a combined signal, a signal processing section which processes the combined signal, and a control section which controls the searcher sections are provided,
the control section generates a control signal for setting the plurality of searcher sections as two types of function-specific searchers which are a cell searcher and a delay spread searcher on the basis of four signals based on effective path timing information on a delay profile of a reception signal output from the searcher section, effective path energy information of a reception signal processed by the finger section, current reception quality associated with a user and output from the signal processing section, and service quality required for the user and registered in system data, and a control signal is changed to optimally maintain set states of the plurality of searcher sections.

2. A search method in a CDMA mobile communication scheme according to claim 1, characterized in that
the control section outputs a search range control signal and search width offset control signal to one searcher section so as to make the searcher section operate as a cell searcher which searches an entire radius of a cell, and
outputs a search range control signal and search width offset control signal to the plurality of searcher sections so as to make the searcher sections operate as delay spread searchers which respectively search a plurality of multi-paths,
the searcher section comprises a plurality of groups of correlators each of which receives, together with a baseband signal, a new spreading code obtained by performing delay processing with respect to a spreading code from a spreading code generator by a search width offset delay circuit and a search delay circuit, and performs despreading, a plurality of groups of adders which add correlation values output from the groups of correlators by a designated number of times, and an effective path determining section which searches for a reception timing with a high level from the correlation values after addition and determines whether a corresponding path is an effective path, and
the search width offset delay circuit controls a search start timing in accordance with a search width offset control signal from the control section, and the search delay circuit controls a search range in accordance with a search range control signal from the control section.

3. A search method in a CDMA mobile communication scheme according to claim 2, characterized in that
the search range control signal for making the searcher operate as the cell searcher sets a value equivalent to a cell radius as a search range, and the search width offset control signal for making the searcher operates as the cell searcher sets 0 as an offset value, and
the search range control signal for making the searcher operate as the delay spread searcher sets a width of peak levels calculated from effective path timing information on a delay profile of a reception signal as a search range, and the search width offset control signal for making the searcher operates as the delay spread searcher sets a start timing of a peak level calculated from effective path timing information on a delay profile of a reception signal as an offset value.

4. A search method in a CDMA mobile communication scheme according to claim 2, characterized in that if a new cell searcher or delay spread searcher must be assigned as the number of users or multi-paths is required to increase while all the searchers are used, the control section obtains numerical values, for all the delay spread searchers in use, calculated by multiplying differences, obtained by subtracting current reception quality values associated with users and output from the signal processing section from service quality values required for the users and registered in system data, by energy information values in effective paths of target delay spread searchers, releases a delay spread searcher in use which exhibits a lowest value of the numerical values, and assigns the released searcher to a new user or multi-path.

5. A search method in a CDMA mobile communication scheme according to claim 2, characterized in that the control section adds products of pieces of energy information of a plurality of paths not less than a predetermined level on a delay profile of the delay spread searcher and pieces of position information to calculate a sum total of the products, calculates position information of the total sum, compares the position information with a threshold of a search range of the delay spread searcher, and changes the search range of the searcher, if the comparison result indicates that the threshold of the search range is exceeded, thereby performing control to match a position of a median of a search range threshold with a position in the sum total.

6. A receiving apparatus in a CDMA mobile communication scheme, characterized by comprising a receiving section which receives a reception signal sent through a radio channel, an analog/digital conversion section which converts the reception signal into a digital baseband signal, a multi-path processing section which includes a plurality of searcher sections and a plurality of finger sections and outputs a plurality of detection signals by processing multi-paths contained in the baseband signal, a RAKE combining section which adds the detection signals to output a combined signal, a signal processing section which processes the combined signal, and a control section which controls said searcher sections, said control section including means for generating a control signal for setting said plurality of searcher sections as two types of function-specific searchers which are a cell searcher and a delay spread searcher on the basis of four signals based on effective path timing information on a delay profile of a reception signal output from said searcher section, effective path energy information of a reception signal processed by said finger section, current reception quality associated with a user and output from said signal processing section, and service quality required for the user and registered in system data, and means for changing a control signal to optimally maintain set states of said plurality of searcher sections.

7. A search method in a CDMA mobile communication scheme, comprising:

a receiving section which receives a reception signal sent through a radio channel, an analog/digital conversion section which converts the reception signal into a digital baseband signal, a multi-path processing section which includes:
a plurality of searcher sections and
a plurality of finger sections
and outputs a plurality of detection signals by processing multi-paths contained in the baseband signal, a RAKE combining section which adds the detection signals to output a combined signal, a signal processing section which processes the combined signal, and a control section which controls the searcher sections, wherein the control section generates a control signal for setting the plurality of searcher sections as two types of function-specific searchers which are a cell searcher and a delay spread searcher on the basis of four signals based on (1) effective path timing information on a delay profile of a reception signal output from the searcher section, (2) effective path energy information of a reception signal processed by the finger section, (3) current reception quality associated with a user and output from the signal processing section, and (4) service quality required for the user and registered in system data, and a control signal is changed to optimally maintain set states of the plurality of searcher sections.

8. A receiving apparatus in a CDMA mobile communication scheme, comprising:

a receiving section which receives a reception signal sent through a radio channel, an analog/digital conversion section which converts the reception signal into a digital baseband signal, a multi-path processing section which includes:
a plurality of searcher sections and
a plurality of finger sections
and outputs a plurality of detection signals by processing multi-paths contained in the baseband signal, a RAKE combining section which adds the detection signals to output a combined signal, a signal processing section which processes the combined signal, and a control section which controls said searcher sections, said control section including:

means for generating a control signal for setting said plurality of searcher sections as two types of function-specific searchers which are a cell searcher and a delay spread searcher on the basis of four signals based on (1) effective path timing information on a delay profile of a reception signal output from said searcher section, (2) effective path energy information of a reception signal processed by said finger section, (3) current reception quality associated with a user and output from said signal processing section, and (4) service quality required for the user and registered in system data, and means for changing a control signal to optimally maintain set states of said plurality of searcher sections.

* * * * *